United States Patent [19]

Billarant

[11] Patent Number: 4,617,214
[45] Date of Patent: Oct. 14, 1986

[54] STRIP OR SIMILAR ELEMENT FOR BEING ATTACHED TO AND COVERED BY A MOLDED ARTICLE AND METHOD

[75] Inventor: Patrick J. Billarant, Charlotte, N.C.
[73] Assignee: Aplix S.A., Paris, France
[21] Appl. No.: 658,336
[22] Filed: Oct. 5, 1984
[30] Foreign Application Priority Data
  Oct. 7, 1983 [FR] France .................... 83 16001
[51] Int. Cl.⁴ ............................................ A44B 21/00
[52] U.S. Cl. ................................. 428/40; 428/100;
  428/120; 428/194; 24/306; 24/444
[58] Field of Search ............. 428/100, 120, 40, 194;
  297/DIG. 6; 24/306, 444

[56] References Cited
U.S. PATENT DOCUMENTS
  4,012,544  3/1977  Richards .......................... 24/306
  4,454,183  6/1984  Wollman ........................... 428/93

Primary Examiner—Alexander S. Thomas
Attorney, Agent, or Firm—W. Thad Adams

[57] ABSTRACT

A tape (4) intended to be attached to a molded article (2) comprises a sole (13) having grippers (5) on one side thereof and anchors (14) on the other side thereof. The side of the sole (13) having the grippers (5) thereon also has two spaced-apart marginal areas devoid of grippers (5) and adapted to be glued temporarily into an internal face of a mold (1) in which the molded article (2) is to be formed. Anchors (14) are comprised of stems (15) having an enlarged head (16) which is molded into the molded article (2) to hold the tape (4) firmly against the molded article (2). The marginal areas devoid of grippers (5) permit tape (4) to lie flush with the surface of the mold (1) while the molded article (2) is being formed.

3 Claims, 3 Drawing Figures

STRIP OR SIMILAR ELEMENT FOR BEING ATTACHED TO AND COVERED BY A MOLDED ARTICLE AND METHOD

TECHNICAL FIELD AND BACKGROUND OF THE INVENTION

The invention relates to a tape, especially a self-gripping tape, one face having gripping means and designed to be attached, by its other face, to a molded article to which it is bonded during the molding operation itself.

More specifically, the invention relates to a tape of this type designed to be attached to a molded foam article, for example, an automobile seat or backrest, and to hold, by its external face having gripping means, an article equipped with complementary gripping means, namely a cover like a seat cover.

SUMMARY OF THE INVENTION

The purpose of this invention is to supply a tape of this type which will firmly bond to the molding material during the molding operation itself.

For this, the tape according to the invention, is made of a sole, the first face of which is equipped with gripping means and two marginal areas having no gripping means and destined to be glued temporarily onto the internal side of the mold for the molding operation. The tape is also characterized by a second face having on at least one part of its width anchoring means protruding from the second face and comprising a flared head on the end of a stem attaching it to the sole.

According to the invention, the gripping means and the anchoring means are made in one piece with the sole.

According to one embodiment of the invention, the population density of the anchoring means is lower than that of the gripping means.

The tape may be made self-adhesive through prior coating of said marginal areas with protective film.

BRIEF DESCRIPTION OF THE DRAWINGS

The invention will be better understood with the following description and with reference to the attached drawing in which.

DESCRIPTION OF THE PREFERRED EMBODIMENT

Figure 2:
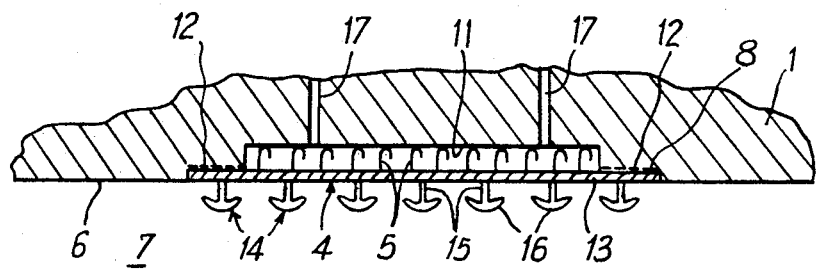
FIG. 2 is a view like that of FIG. 1 and shows the tape attached to the internal face of the mold, prior to molding.
Figure 3:
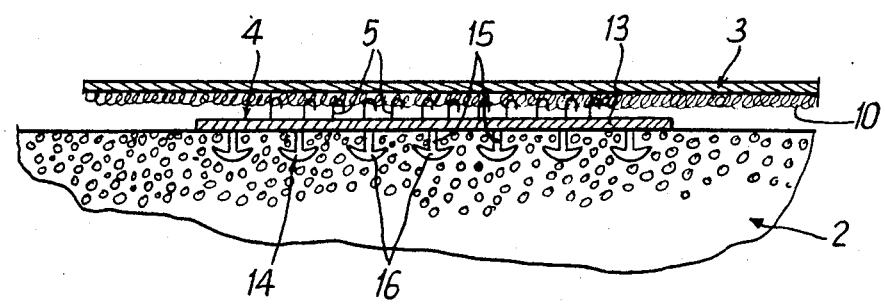
FIG. 3 is a view like that of FIG. 1 and shows the finished article with the fastening tape of a cover attached to it.

Referring now specifically to the drawings, FIG. 2 shows part of a mold 1, in aluminum for example, for the manufacture of a molded article 2, shown partially in FIG. 3. This article is, in the preferred mode of application of the invention, a seat or backrest in polyurethane foam, polyether type, for an automobile seat.

Article 2 is intended to receive a cover 3 (FIG. 3), a seat cover for example in the application being considered. The molded article 2 grips the cover 3 by means of a gripping tape 4 which is positively attached to molded article 2 and which, on its side facing cover 3, is equipped with gripping means 5, in the shape of hooks, for example, destined to match the reverse side of cover 3 having, to this effect, a pile or fibrous fabric 10, brushed jersey for example.

Figure 1:
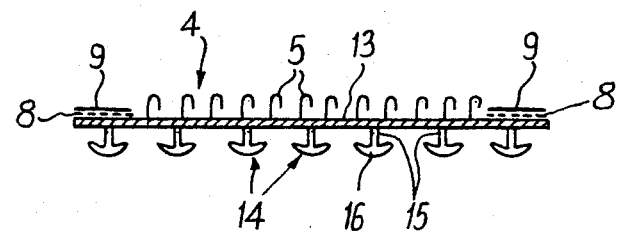
FIG. 1 is a cross section of a tape according to one type of design of the invention.

Tape 4 (see FIG. 1) is attached, by known means to the outer face of molded article 2, during the molding operation itself. For this, as shown in FIG. 2, tape 4 is temporarily attached to the internal face 6 of mold cavity 7 provided in mold 1. For such bonding, tape 4, having on its outer face the gripping means 5, has two marginal longitudinal areas devoid of gripping means 5 and an adhesive coating 8 protected by a film 9 to be removed when attaching tape 4 onto internal face 6 of the mold.

To accommodate tape 4, mold 1 provides a cavity 11 to receive gripping means 5 and, on each side of this cavity, two lateral cavities 12, to accommodate the adhesive coated marginal areas of tape 4, protective film 9 being removed from these areas. The depth of the main cavity or groove is such that the gripping means may come and rest in its bottom and that face of sole 13 opposite to that having the gripping means is flush with internal face 6 of mold 1. Lateral cavities or groove 12 have a depth which matches roughly that of thickness of sole 13. Thus, the face of sole 13 opposite to that having the gripping means 5 is a prolongation of internal surface 6 without discontinuity; furthermore, tape 4 is held against mold 1, on the one hand by the lateral areas resting in cavities 12 and, on the other hand, by default, in the center, by the gripping means 5 resting in the bottom of cavity 11. Thus, during the foaming cycle of the molding material, the pressure of this material which is applied against tape 4 will not result in any deformation of the latter.

Since side of sole 13 facing toward the inside of the mold is level with the internal face 6 of the latter, the sole 13 is protruding, of as much as it is thick, on finished article 2, as shown on FIG. 3.

In order to insure a perfect bond of tape 4 with the molding material, according to the invention, anchoring means 14 are provided which protrude from sole 13, roughly at right angle. Each anchoring means comprises a stem or foot 15 which has a free end which extends away from sole 13 and has a flared head 16. Head 16 may be of any appropriate shape; for example, it may be made of petals or separate lips, from each side of stem 15, edges being rounded or sharp. As another example, head 16 may be shaped like an arrow or a mushroom.

As can be seen on the Figures, the population density of the anchoring means 14 is lower than that of gripping means 5. For example, for a tape 4 having a width of 30 mm (1 3/16"), there may be 12 rows of gripping means 5 and only seven rows of anchoring means 14, the longitudinal spacing being 1 mm (0.040") for the gripping means and 4 mm (0.157") for the anchoring means.

As shown in the Figures, anchoring means 14 may be layed on a larger width than gripping means 5. This is because the outside row of anchoring means may be located directly under the adhesive marginal area of the tape. Perpendicularly to the sole, gripping means 5 could have a height of approximately 2 mm (0.079") and anchoring means 14, a height of approximately 3 to 5 mm (0.118 to 0.197").

According to a characteristic of the invention, gripping means 5 and anchoring means 14 are made in one piece with sole 13. For this, a tape of even section is extruded through a die having an appropriate profile comprising sole 13 and rails or extrusions which profile correspond to that of gripping means 5 and to that of anchoring means 14; after extrusion and cooling, the extruded tape is cross cut, with or without removal of material, to obtain separate gripping elements and separate anchoring elements.

When tape 4 has been placed into mold 1, as seen in FIG. 2, the molding material is injected into the mold, filling cavity 7 by foaming. During this phase, the molding material intimately penetrates into anchoring means 14 and, as seen in FIG. 3 for the finished product, heads 16 on the stems 15 act as so many anchoring points which insure the positive fastening of tape 4 onto the molded article.

It is to be noted that this method of fastening the tape is of the mechanical type, and not chemical as it was known in the prior technique. This mechanical liason is especially strong because on the surface of the molded article a skin is formed naturally which is stronger than the rest of the article. It is also to be noted that the spacing of anchoring means 14, lengthwise or crosswise, has no practical influence on the strength of this skin.

When article 2 is extracted from mold 1, with tape 4 firmly anchored onto the article, sole 13 is protruding in relation to article 2, of as much as its thickness, so that gripping means 5 are perfectly free to be able to cooperate with the structure 10 of cover 3. On FIG. 3, cover 3 is shown slightly away from molded article 2, for clarity of the drawing.

It is to be noted, that during the molding operation, whatever the molding material may be, the latter cannot penetrate into cavity 11 since the marginal areas of the tape are glued to the internal surface of the mold, furthermore, in the small cavities 12, this mean of temporary liason of the tape to the mold constitute an efficient seal.

According to another characteristic of the invention, cavity 11 communicates with the outside through at least one vent 17 which prevents pressure build-up in cavity 11 during the rise in temperature of the molding process, this pressure could possibly result in the unglueing of the tape in cavity 12 and, consequently, a penetration of the molding material into cavity 11.

I claim:

1. A tape intended to be attached to a molded article, said tape comprising a sole having a gripping means on one side thereof together with two spaced-apart marginal areas devoid of said gripping means and adapted to be glued temporarily onto the internal face of a mold in which the molded article is to be formed, said tape also having a second face comprising on at least part of its width anchoring means projecting from said second face for anchoring said tape into the structure of the molded article, said anchoring means comprising a plurality of stems attached to and extending outwardly from said sole with at least some of said stems having enlarged, anchoring heads thereon, said gripping means and said anchoring means being integrally formed with said sole.

2. A tape intended to be attached to a molded article, said tape comprising a sole having a gripping means on one side thereof together with two spaced-apart marginal areas devoid of said gripping means and adapted to be glued temporarily onto the internal face of a mold in which the molded article is to be formed, said two marginal areas devoid of gripping means being coated with an adhesive for temporarily fastening the tape to the internal face of the mold, and including a film for protecting the adhesive until said tape is attached to the internal face of the mold, said tape also having a second face comprising on at least part of its width anchoring means projecting from said second face for anchoring said tape into the structure of the molded article, said anchoring means comprising a plurality of stems attached to and extending outwardly from said sole with at least some of said stems having enlarged, anchoring heads thereon.

3. A tape intended to be attached to a molded article, said tape comprising a sole having gripping means comprising numerous rows of hooking projections on one side thereof together with two spaced-apart marginal areas devoid of said hooking projections and adapted to be glued temporarily onto the internal face of a mold in which the molded article is to be formed, said tape also having a second face comprising on at least part of its width anchoring means projecting from said second face for anchoring said tape into the structure of the molded article, said anchoring means comprising a plurality of stems attached to and extending outwardly from said sole with at least some of said stems having enlarged, anchoring heads thereon.

* * * * *